US012664497B2

(12) United States Patent
Sun et al.

(10) Patent No.: US 12,664,497 B2
(45) Date of Patent: Jun. 23, 2026

(54) DATA-BASED WORKFLOW GENERATION DEVICE AND METHOD THEREOF

(71) Applicants:DIGIWIN CO., LTD., Shanghai (CN);
DATA SYSTEMS CO., LTD., New
Taipei City (TW)

(72) Inventors: Guoxin Sun, Shanghai (CN); **Zhi
Zhang**, Shanghai (CN)

(73) Assignees: DIGIWIN CO., LTD., Shanghai (CN);
DATA SYSTEMS CO., LTD., New
Taipei City (TW)

( * ) Notice: Subject to any disclaimer, the term of this
patent is extended or adjusted under 35
U.S.C. 154(b) by 162 days.

(21) Appl. No.: 18/460,619

(22) Filed: Sep. 4, 2023

(65) Prior Publication Data

US 2024/0311724 A1 Sep. 19, 2024

(30) Foreign Application Priority Data

Mar. 14, 2023 (CN) .......................... 202310245844.1

(51) Int. Cl.
*G06Q 10/0631* (2023.01)
*G06Q 10/0633* (2023.01)

(52) U.S. Cl.
CPC ... *G06Q 10/06316* (2013.01); *G06Q 10/0633*
(2013.01)

(58) Field of Classification Search
CPC ..................... G06Q 10/06316; G06Q 10/0633
See application file for complete search history.

(56) References Cited

U.S. PATENT DOCUMENTS

| | | | | |
|---|---|---|---|---|
| 2004/0078105 A1* | 4/2004 | Moon | ................... | G06Q 10/10 |
| | | | | 700/100 |
| 2015/0039343 A1* | 2/2015 | Cline | .................... | G16H 10/60 |
| | | | | 705/3 |
| 2015/0127628 A1* | 5/2015 | Rathod | ................. | G06F 16/955 |
| | | | | 707/710 |
| 2016/0072676 A1* | 3/2016 | Gomadam | .............. | H04L 67/34 |
| | | | | 709/221 |
| 2018/0152506 A1* | 5/2018 | Simó | ...................... | G06Q 10/06 |
| 2018/0330293 A1* | 11/2018 | Kulkarni | ........... | G06K 7/10366 |
| 2022/0130380 A1* | 4/2022 | Touati | ....................... | G06F 8/30 |

(Continued)

OTHER PUBLICATIONS

Žáková, Monika, et al. "Automating knowledge discovery work-
flow composition through ontology-based planning." IEEE Trans-
actions on Automation Science and Engineering 8.2 (2010): 253-
264. (Year: 2010).*

(Continued)

*Primary Examiner* — Andre D Boyce
(74) *Attorney, Agent, or Firm* — JCIPRNET

(57) ABSTRACT
A data-based workflow generation device and method
thereof are provided. The data-based workflow generation
device includes a storage device and a processor. The
processor is coupled to the storage device. The processor
receives a data set. The processor takes the data set as an
input data set, and searches a data map according to the input
data set to obtain a best task path. The processor executes the
best task path to obtain an output data set. The processor
takes the output data set as the input data set, and repeatedly
searches the data map according to the input data set, and
executes a corresponding best task path until the output data
set is the same as a target data set.

14 Claims, 5 Drawing Sheets

(56) References Cited

U.S. PATENT DOCUMENTS

| | | | |
|---|---|---|---|
| 2023/0086327 A1* | 3/2023 | Song | G06V 20/64 |
| | | | 382/159 |
| 2023/0393832 A1* | 12/2023 | Touati | H04L 67/10 |
| 2024/0202208 A1* | 6/2024 | Van Haren | G06F 16/26 |

OTHER PUBLICATIONS

Gil, Yolanda, et al. "A semantic framework for automatic generation of computational workflows using distributed data and component catalogues." Journal of Experimental & Theoretical Artificial Intelligence 23.4 (2011): 389-467. (Year: 2011).*

* cited by examiner

601

| Input data |

602

| Task |

603

| Output data |

600

610     611         612     620     613

| Insufficient quantity of purchased parts | → | Completed purchase data | → | Purchasing draft not yet approved |

614

| Purchasing internal review task |

640    617     630    616        615

| Purchase order issued data | ← | Purchase issuing task | ← | Purchase draft approved data |

618

| Delivery date checking task |

619

| Replied delivery date data |

DATA-BASED WORKFLOW GENERATION DEVICE AND METHOD THEREOF

CROSS-REFERENCE TO RELATED APPLICATION

This application claims the priority benefit of China application serial no. 202310245844.1, filed on Mar. 14, 2023. The entirety of the above-mentioned patent application is hereby incorporated by reference herein and made a part of this specification.

BACKGROUND

Technical Field

The disclosure relates to a data workflow generation device, and in particular relates to a data-based workflow generation device and a method thereof.

Description of Related Art

In the field of enterprise management, the business workflow management system is configured to process the management of enterprise business behavior, which performs business processing through forms and workflows. However, these business logic and data are not only related to each other, but also scattered in various information systems, electronic forms, and the experience of various staff members, resulting in the inability to effectively perceive data changes and respond and process them in a timely manner. Moreover, the conventional business logic is only used for passive operations by users to assist manual data processing, rather than replacing the user. Therefore, there are actually still a large number of operations that need to be initiated by the user. In this regard, the main problem is that the conventional system has insufficient carrying capacity for knowledge, which still relies on the experience of each operator to make judgments. In addition, the existing system establishes a complete set of systems according to different enterprise systems and different business projects, which makes it difficult for the existing system and system architecture to be flexibly applied to the workflows of different enterprises or different business projects. Moreover, it cannot meet the requirements of various business scenarios, and cannot effectively use the established business workflow. In this regard, the above problems are difficult to overcome in the current conventional process engine or enterprise resource planning (ERP) system.

SUMMARY

According to an embodiment of the disclosure, the data-based workflow generation device includes a storage device and a processor. The processor is coupled to the storage device and is configured to receive a data set. The processor takes the data set as an input data set, and searches a data map according to the input data set to obtain a best task path. The processor executes the best task path according to the data set to obtain an output data set. The processor takes the output data set as the input data set, and repeatedly searches the data map according to the input data set. The processor executes a corresponding best task path until the output data set is the same as a target data set.

According to an embodiment of the disclosure, a data-based workflow generation method includes the following operation. A data set is received. The data set is taken as an input data set, and a data map is searched according to the input data set to obtain a best task path. The best task path is executed according to the data set to obtain an output data set. The output data set is taken as the input data set, and the data map is repeatedly searched according to the input data set. A corresponding best task path is executed until the output data set is the same as a target data set.

Based on the above, the data-based workflow generation device and the execution method of this disclosure may automatically generate the task data on the best task path and the output data after executing a task according to the current data set and the target data set.

In order to make the above-mentioned features and advantages of the disclosure comprehensible, embodiments accompanied with drawings are described in detail below.

DETAILED DESCRIPTION OF DISCLOSED EMBODIMENTS

Figure 1:
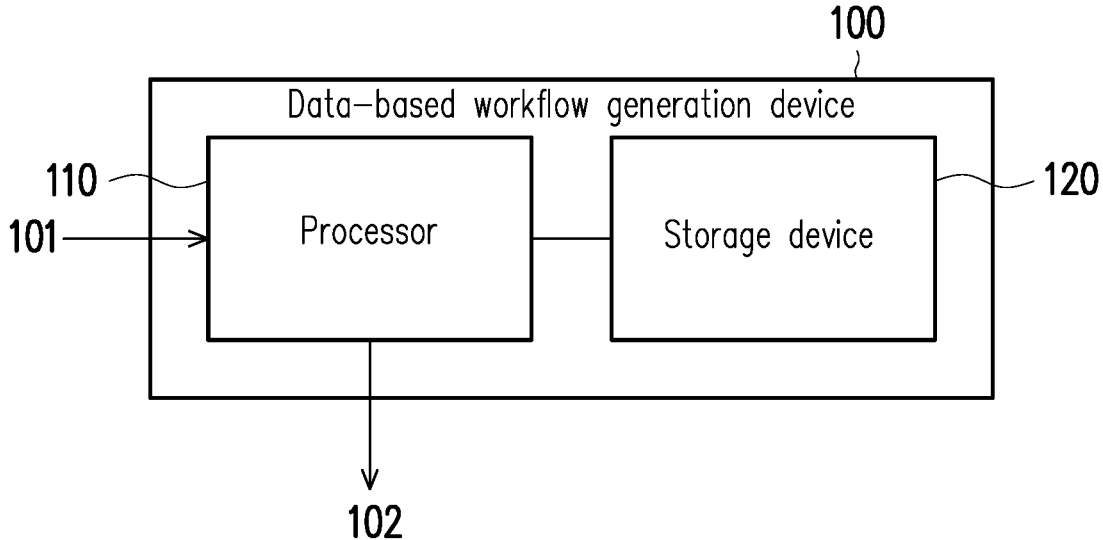
FIG. 1 is a circuit schematic diagram of an execution device of an embodiment of the disclosure.

References of the exemplary embodiments of the disclosure are to be made in detail. Examples of the exemplary embodiments are illustrated in the drawings. If applicable, the same reference numerals in the drawings and the descriptions indicate the same or similar parts.

Figure 2:
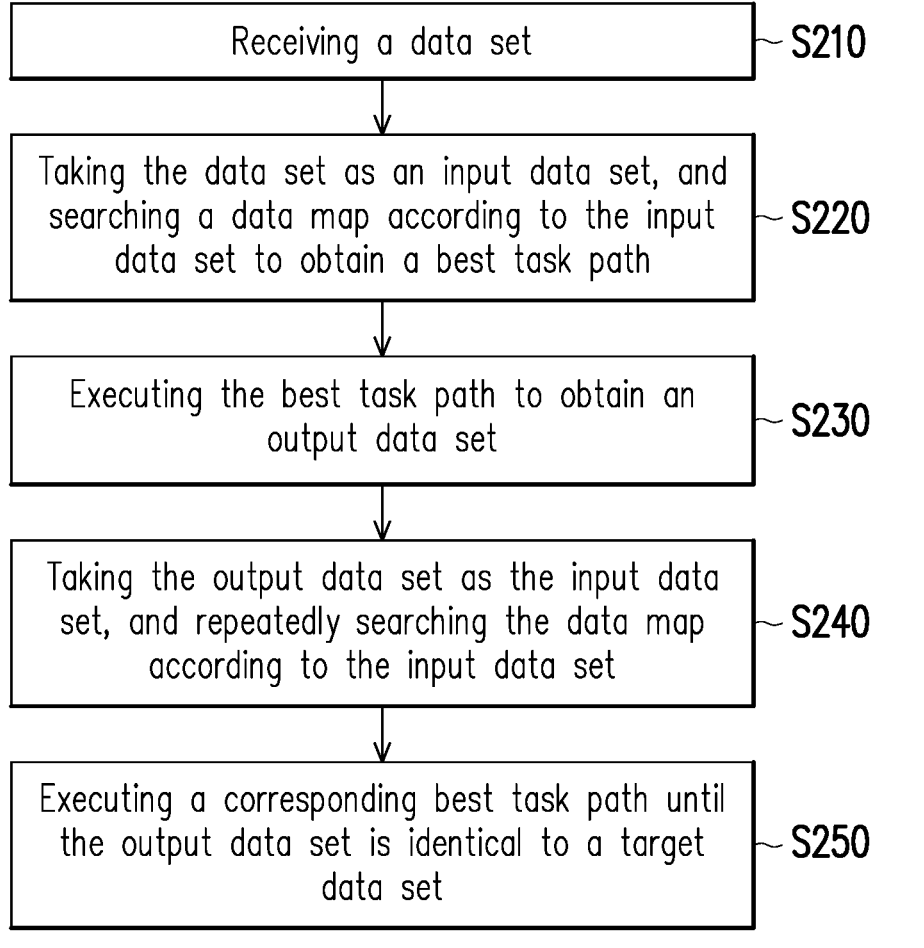
FIG. 2 is a flowchart of an execution method of an embodiment of the disclosure.

FIG. 1 is a circuit schematic diagram of an execution device of an embodiment of the disclosure FIG. 2 is a flowchart of an execution method of an embodiment of the disclosure. Referring to FIG. 1 and FIG. 2, the workflow generation device 100 includes a processor 110 and a storage device 120. The processor 110 is coupled to the storage device 120. In this embodiment, the processor 110 may include a processing circuit such as a central processing unit (CPU), a microprocessor control unit (MCU), or a field programmable gate array (FPGA), or a chip with data computing functions, but the disclosure is not limited thereto. The storage device 120 may be a memory, in which the memory may be a non-volatile memory such as a read only memory (ROM), an erasable programmable read only memory (EPROM), a volatile memory such as a random access memory (RAM), and storage devices such as a hard disc drive and a semiconductor memory, etc. The memory is used to store various modules, software, units, programs, data, and information, etc., mentioned in the disclosure, for the processor 110 to read and execute. Alternatively, the processor 110 and the storage device 120 may also be formed by processing circuits and storage devices of multiple computing devices. It should be noted that the modules, engines, and units described in the various embodiments of the disclosure may be individually implemented by corresponding one or more algorithms and/or software, and the relevant functions and operations described in the embodiments may be realized according to the execution results of one or more algorithms and/or software.

In one embodiment, the workflow generation device 100 may also be set on a cloud server, for users (i.e., enterprises) or tenants (employees of the enterprise) to connect and execute the related business service function of the application programming interface (API) set in the cloud server, so as to operate the automatic task workflow matching function and the task execution function of the workflow generation device 100. The cloud server may be, for example, a software as a service (SaaS) server, and the API corresponds to the SaaS application, but the disclosure is not limited thereto. Alternatively, in another embodiment, the workflow generation device 100 may be set in an enterprise resource planning (ERP) system operated by a local server in the enterprise, so as to provide an automatic plan recommendation function through a corresponding application programming interface.

Referring to FIG. 1 to FIG. 2, the workflow generation device 100 may execute the following steps S210 to S250. In step S210, the processor 110 receives the data set 101. In this embodiment, the user may output the data set 101 to the processor 110. The data set is the current data set and the target data set 102, and the current data set includes current description data, state data, and feature data. Furthermore, the target data set 102 includes target description data, state data, and feature data. Description data is related to a description about the data or related to the type of the data. In other words, different description data have different data structures, so data with the same description data have the same data structure. Data structure may be, for example, which fields are included, what type of field, the content of the primary key and the unique key, etc. Description data are, for example, purchase requisitions, purchase orders, and orders.

State data is related to a state of the data. In other words, state data means that the system gives a stable state definition to the data including a series of feature data. This state definition may be applied to a data processing node in the data processing workflow. The state data may be states such as unapproved, reviewed, approved, issued, and purchase completed. The current feature data are features related to the current data, and the feature data may be data such as urgency, priority treatment, age, occupation, gender, and hobbies, etc. Different feature data corresponds to different processing rules (i.e., different task data).

In step S220, the processor 110 takes the data set 101 as an input data set, and searches a data map according to the input data set to obtain a best task path. The storage device 120 may store a data map. In this embodiment, the processor 110 may search the data map according to the current data set and the target data set in the data set 101 to obtain the best task path. In this regard, the processor 110 takes the aforementioned current data set as the starting point of the path and takes the aforementioned target data set 102 as the ending point of the path. In this way, the processor 110 may use a map algorithm to query a previously established data map to find the best task path (the fastest path or the shortest path among the reachable paths).

In step S230, the processor 110 executes the best task path to obtain the output data set. In this embodiment, the processor 110 executes the best task path according to the current data set to obtain an output data set generated after executing the best task path. The output data set includes description data, state data, and feature data. In step S240, the processor 110 takes the output data set as the input data set, and repeatedly searches the data map according to the input data set. In this embodiment, the processor 110 takes the output data set obtained in step S230 as an input data set, and searches the data map again to obtain the corresponding best task path. Next, in step S250, the processor 110 executes the corresponding best task path until the output data set is the same as the target data set 102. In this embodiment, the processor 110 executes the best task path obtained in step S240, and obtains a corresponding output data set. In this embodiment, when the output data set is the same as the target data set 102, the processor 110 ends the workflow. When the output data set is different from the target data set 102, the processor 110 repeatedly executes step S240 to take the output data set as the input data set, and then executes step S250.

Therefore, the data-based workflow generation device 100 and the data-based workflow generation method may effectively and automatically take each output data set as the input data set to repeatedly execute the search of the data map and the execution of the task (e.g., the best task path). In this way, the data-based workflow generation device 100 and the data-based workflow generation method may provide the task workflow that best fits the current data set, and by achieving a step-by-step comparison between the data and the workflow, the processor may execute tasks that are closer to the current data, thereby effectively improving the efficiency and accuracy of the data workflow.

Figure 3:
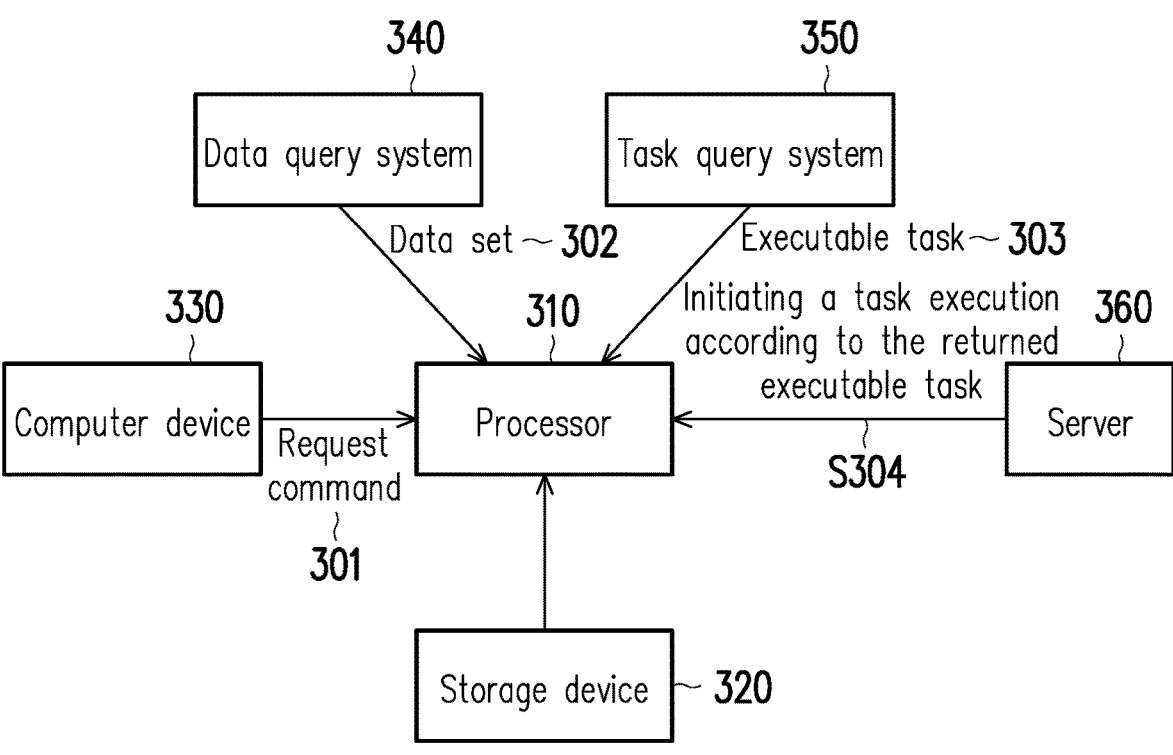
FIG. 3 is a schematic diagram of multiple systems, servers, processors and devices of an embodiment of the disclosure.

FIG. 3 is a schematic diagram of multiple systems, servers, processors and devices of an embodiment of the disclosure. In this embodiment, the workflow generation device 100 may include a data query system 340, a task query system 350, and a server 360 as shown in FIG. 3, but the disclosure is not limited thereto. In this embodiment, the data query system 340, the task query system 350, and the server 360 may, for example, be respectively realized in programming languages such as JSON (JavaScript object notation), extensible markup language (XML) or YAML, but the disclosure is not limited thereto. In another embodiment, the data query system 340, the task query system 350, and the server 360 may be respectively realized by different servers. In this embodiment, the processor 110 may read and execute the application program interfaces (APIs) of these systems and servers to realize the functions of automatically matching task paths and executing tasks of the disclosure, so as to generate the corresponding target data set 102.

Referring to FIG. 2 to FIG. 3, the workflow generation device 100 may execute the following step S304. In this embodiment, the user inputs a request command 301 into the processor 310 through a computer device 330. Next, the processor 310 receives the request command 301, and the processor 310 searches the database according to the request command 301 to obtain a data set 302. In this embodiment, the database is the data query system 340. In other words, the processor 310 obtains the corresponding data set 302 from the data query system 340 according to the data in the request command 301. Moreover, the processor 310 inputs the data set 302 into the task query system 350 to search the data map, thereby obtaining an executable task 303. In step S304, the processor 310 inputs the executable task (i.e., the best task path) to the server 360 so as to execute the corresponding task through the server 360.

In another embodiment, the processor 310 performs data encapsulation on the initial data (i.e., the current data) in the request command 301 to generate the data set 302, and the processor 310 searches the data map according to the data set 302 and the implementation target (i.e., the target data set

5

102) of the request command 301 of data processing, so as to obtain at least one task path (i.e., the best task path). In other words, the data map may return the data definition corresponding to the state data, and convert the business data into a data set (including description data, state data, and feature data) recognizable by the device according to the definition.

Figure 4:
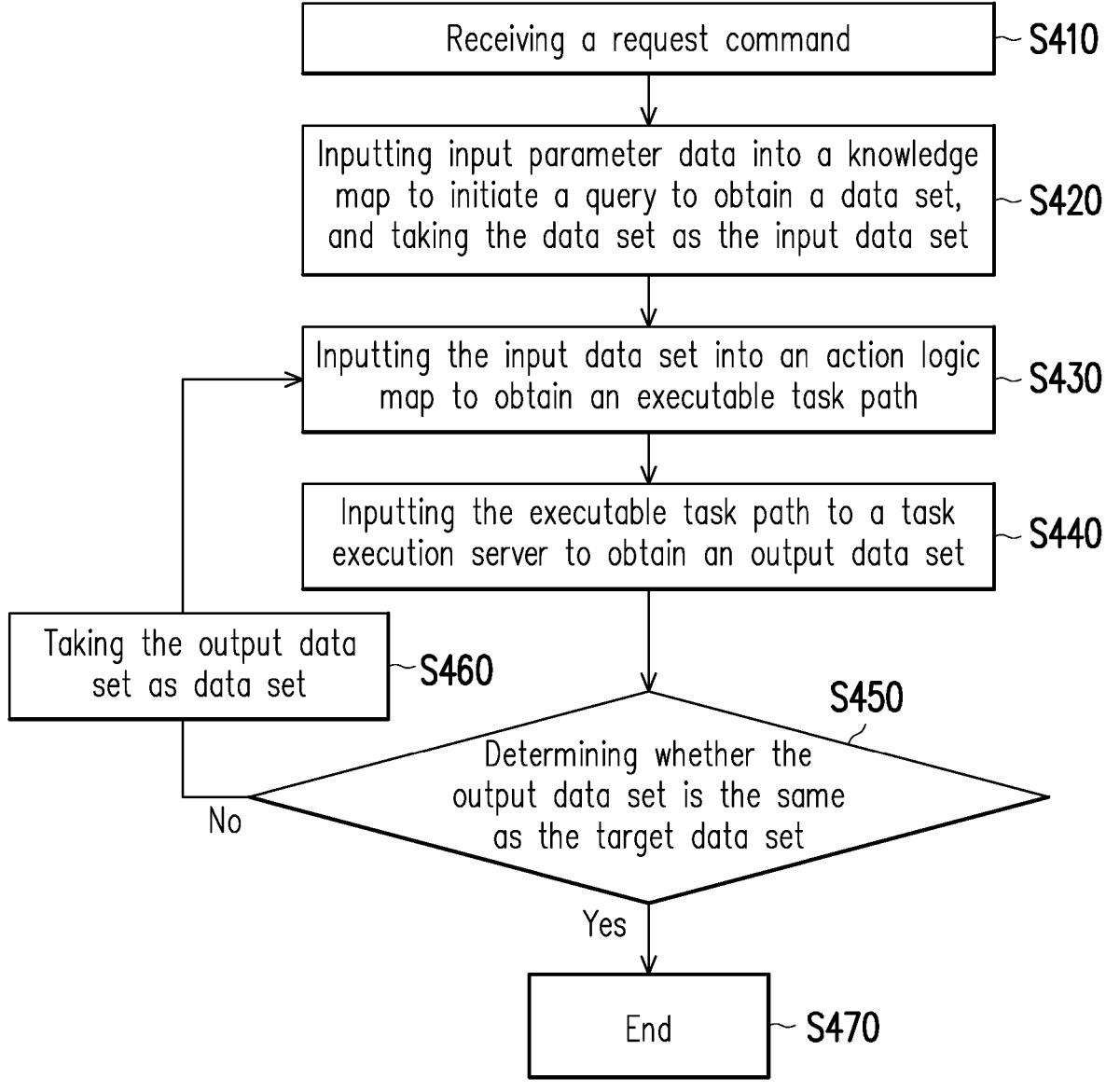
FIG. 4 is a flowchart of an execution method of an embodiment of the disclosure.

FIG. 4 is a flowchart of an execution method of an embodiment of the disclosure. Referring to FIG. 2 to FIG. 4, the workflow generation device 100 may execute the following steps S410 to S470. In step S410, the processor 310 receives the request command 301. Next, in step S420, the processor 310 inputs the input parameter data (i.e., the data in the request command 301) into a knowledge map (i.e., the database) to initiate a query, so as to obtain the data set 302. Additionally, the processor 310 takes the data set 302 as an input data set. In step S430, the processor 310 inputs the input data set into an action logic map (i.e., the data map) to obtain an executable task path. In step S440, the processor 310 inputs the executable task path to the task execution server (i.e., the server 360) to obtain an output data set generated after the task is executed.

It should be noted that in step S450, the processor 310 determines whether the output data set is the same as the target data set 102 in the data set. In step S450, when the processor 310 determines that the output data set is the same as the target data set 102, step S470 is executed to end the current workflow. When the processor 310 determines that the output data set is different from the target data set 102, the processor 310 executes step S460 to take the output data set as a data set (i.e., the input data set) and executes step S430. In this way, the processor 310 repeatedly executes step S430, step S440, step S450, and step S460 until the output data set is the same as the target data set 102.

Figure 5:
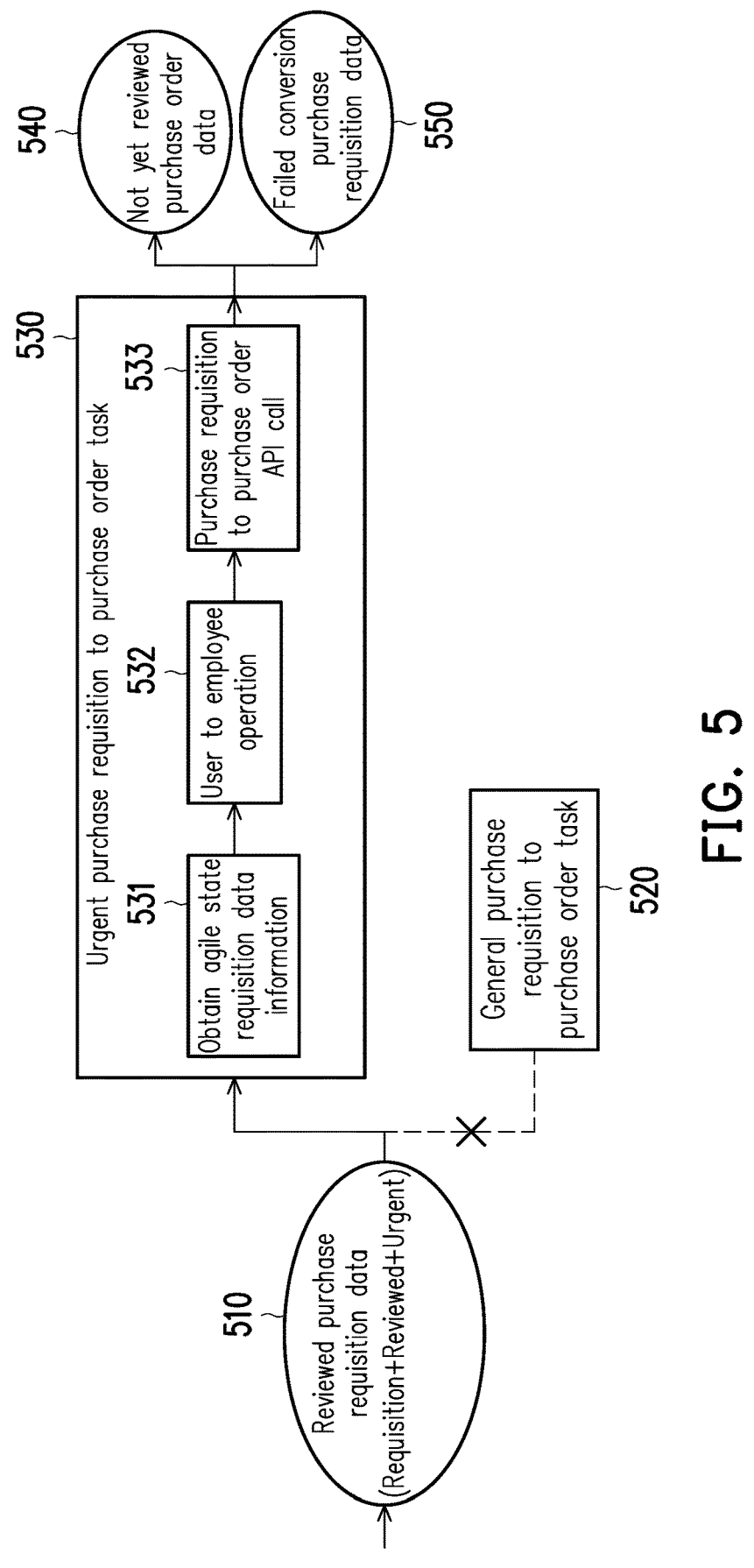
FIG. 5 is a schematic diagram of a best task path of an embodiment of the disclosure.

FIG. 5 is a schematic diagram of a best task path of an embodiment of the disclosure. Referring to FIG. 1 and FIG. 5, the current data set includes description data, state data, and feature data. In this embodiment, the description data of the input data set 510 is "purchase requisition", the state data is "reviewed", and the feature data is "urgent". The processor 110 determines the matching degree with multiple task paths in the data map based on the state data of the data set, so as to select the task path with the highest matching degree as the best task path.

As shown in FIG. 5, the task data 530 and the task data 520 (i.e., the general purchase requisition to purchase order task) fits the purchase requisition (description data) and the reviewed (state data) in the input data set 510. The processor 110 further compares, and the task data 530 fits the urgent (feature data) of the input data set 510. Therefore, the best task path fitting the input data set 510 is the urgent purchase requisition to purchase order task (i.e., task data 530), which includes task 531, task 532, and task 533. The task 531 is obtaining agile state (i.e., fast changing) purchase requisition data information, the task 532 is a user to employee operation, and the task 533 is a purchase requisition to purchase order API call. The processor 110 executes the task data 530 (e.g., step S440 in FIG. 4) to obtain an output data set, and the processor 110 generates an output data set 540 or an output data set 550 according to the execution result. In other words, when the execution result of the execution of the task data 530 by the processor 110 is successful, the converted not yet reviewed purchase order data (i.e., the output data set 540) is output. When the execution result of the execution of the task data 530 by the processor 110 is failed, the processor 110 outputs the failed conversion purchase requisition data (i.e., the output data set 550).

In this embodiment, the storage device 120 stores the data set, the input data set, the task data, and the input data set. It is worth noting that the data map includes multiple task data and a directional parameter, and the directional parameter includes node data and connection data. The connection data is related to the connection relationship between multiple task data, which may be the connection relationship, as well as output and input data, between task data A and task data B. For example, the best task path of output data set A1 of task data A is task data B. Node data is related to description data, state data, feature data, and data code. The data map includes multiple node data, in which each node data corresponds to different description data and state data. In another embodiment, the connection data is related to the feature data of the current data set.

It should be noted that the data types or description data mentioned in the various embodiments of the disclosure refer to the data including multiple fields used to define the type of the data itself, and these fields may include different types of fields, different primary keys, and unique keys, and the disclosure is not limited thereto. Moreover, the same data type may have the same, similar, or different data structures, and the disclosure is not limited thereto. In addition, the state data mentioned in the various embodiments of the disclosure refers to a stable state definition given by the system to data including a series of feature data, and this state definition may be applied to a data processing node in the data process, so that the system and device may redirect to this data processing node according to processing requirements during the data process.

Figures 6A, 6B:
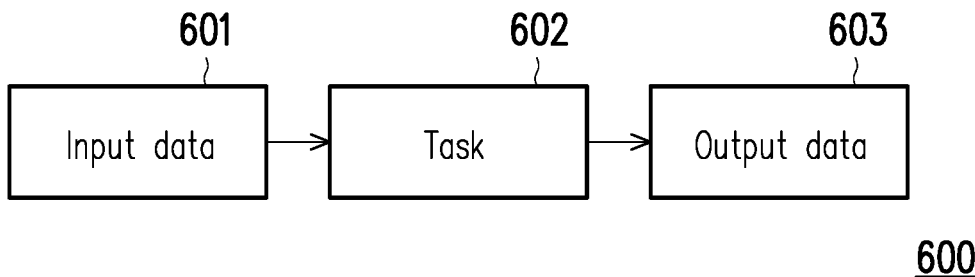
FIG. 6A is a schematic diagram of a data model of an embodiment of the disclosure.
FIG. 6B is a schematic diagram of a task list of an embodiment of the disclosure.

FIG. 6A is a schematic diagram of a data model of an embodiment of the disclosure. FIG. 6B is a schematic diagram of a task list of an embodiment of the disclosure. A data map may include multiple data models. The processor 110 predetermines multiple reference description data, multiple reference features, and multiple reference state data, and predetermines multiple reference target data and creates multiple reference task data. The processor 110 creates multiple reference task paths according to multiple reference description data, multiple reference state data, multiple reference target data, and multiple task data. In this way, the processor 110 may select one of the multiple reference task paths to generate the best task path. The best task path includes task data corresponding to the current data set.

In one embodiment, the processor 110 preemptively creates a data map based on the relationship between multiple reference description data and multiple task data, and stores the data map into the storage device 120. The data model 600 (data-task-data) is formed by corresponding input data set 601, a corresponding task 602, and corresponding output data set 603. In data model 600, the task 602 is used to process input data 601 having certain features, and then output data 603 of another data type or feature data. The output data 603 may be taken as input data for another or the next data model. The input data 601 and the output data 603 may be generalized as data entities. The task 602 may be generalized into a logical entity.

In this way, the execution system 100 may create in advance various possible data types, the possible states of each data type, and the flow relationship between state data of the entire business workflow (enterprise workflow) for use in subsequent queries.

More specifically, the task 602 is the smallest business logic unit in the data engine, and is responsible for specific business logic execution. The task 602 may process a certain type of data with a certain feature in a certain environment, and may output another type of data or state data. The task type of the task 602 may split the task according to different data processing dimensions. In this regard, the task 602 may be divided into, for example, a manual execution task and an automatic execution task according to the execution manner. The task 602 may be classified into, for example, an approval type, a reply type, and an abnormal removal type according to the business type. The task 602 may be divided into, for example, script, allocation, and internal workflow, etc. according to the implementation manner. The implementation of the task 602 may adopt a data platform mode. In this regard, the data platform may provide high-level encapsulation and abstraction for the task, and may provide an abstract interface to realize the specific business at the bottom level, pass context information and various tools provided by the data platform to the task implementation, and specify a fixed return model. The return model may include, for example, the returned state (the data platform performs different processing according to the returned state), the returned description message, the global workflow variables returned to the platform, and the returned data example message (e.g., including one or more data types, feature data, and data entities, etc.).

It should be noted that the feature data mentioned in the various embodiments of the disclosure refer to a series of features extracted from the data entity itself, so that the system may process the data according to the corresponding processing rules.

FIG. 6B is a schematic diagram of a task list of an embodiment of the disclosure. Referring to FIG. 6B, for example, multiple data models 610 to 640 may form a task path as shown in FIG. 6B. From another perspective, the best task path is a task list formed by multiple data models 610 to 640. As shown in FIG. 6B, the data model 610 includes the data 611 of insufficient quantity of purchased parts, the task 612 of completing the purchase data, and the data 613 of purchasing draft not yet approved. The data 611 of insufficient quantity of purchased parts is input into the task 612 of completing the purchase data, and after calculating or data processing the task 612 of completing the purchase data by the logical entity, the data 613 of purchasing draft not yet approved may be generated. The data 613 of purchasing draft not yet approved subsequently serves as the input data of the data model 620. The data model 620 includes data 613 of purchasing draft not yet approved, tasks 614 of purchase internal audit, and data 615 of purchasing draft approved. The data 613 of purchasing draft not yet approved is input into the task 614 of the purchase internal review, and after calculating or data processing of the task 614 of purchase internal review by the logical entities, the data 615 of purchasing draft approved may be generated. The data 615 of purchasing draft approved subsequently serves as the input data of the data model 630. The data model 630 includes the data 615 of purchasing draft approved, the task 616 of purchase issued, and the data 617 of purchase order issued. The data 615 of purchasing draft approved is input into the task 616 of purchase issued, and after calculating or data processing the task 616 of purchase issued by the logical entity, the data 617 of purchase order issued may be generated. The data 617 of purchase order issued subsequently serves as the input data of the data model 640. The data model 640 includes the data 617 of purchase order issued, the task 618 of delivery date (i.e., delivery deadline) reply check, and the data 619 of delivery date replied. The data 617 of purchase order issued is input into the task 618 of delivery date reply check, and after calculating or data processing the task 618 of delivery date reply check by the logical entity, the data 619 of delivery date replied may be generated.

In an embodiment, the best task path used for the recommended plan may have the shortest execution path, the shortest execution time, or the highest recommended degree, etc., but the disclosure is not limited thereto. In another embodiment, when multiple task paths have the same matching degree, the processor 110 may further select one of the multiple task paths according to a preset rule to generate the best task path (i.e., the recommended plan). The preset rule may be, for example, a specific recommended plan preset for a specific current state data or a specific implementation target, or a specific recommended plan or a best task path determined according to a previous user operation history.

In this embodiment, the processor 110 may perform data encapsulation on the initial data of the data processing request to obtain data having a certain state data (e.g., reviewed or not yet approved), and search the data map. In addition, it should be noted that, on the basis of the data map structure, there may also be data transfer between multiple task paths (i.e., multiple plans) generated by the workflow generation device 100. For example, the task A may generate data for another plan, or the data may also be executed by a task B in another plan. In one embodiment, the processor 110 may also receive a path selection command according to the user interface of the workflow generation device 100 to generate a real-time model (i.e., generate models 610 to 640 as shown in FIG. 6B according to the command and selection of the user), and the processor 110 may generate a recommended plan according to the real-time model and the pre-stored offline model.

In one embodiment, the workflow generation device 100 may include a user interface for receiving a request command 301 input by a user. The real-time model may be adjusted through means such as user modification or offline simulation to generate a final execution plan, so that the final execution plan may be directly used subsequently. Alternatively, the real-time model may also refer to plans modified by the user or generated by the offline simulation during the process of generating the recommended result. Therefore, the workflow generation device 100 may effectively and automatically generate the best task path corresponding to the request command 301, so as to automatically complete the workflow of realizing the target data set. Moreover, during the execution of the task path, the workflow generation device 100 may also effectively eliminate the problem of abnormal data according to the manual operation of the user or automatic execution of relevant task logic.

To sum up, in order to break through the limitations of the conventional system for realizing business logic, the data model-based workflow generation device and execution method of the disclosure provide a way to repeatedly match the appropriate task path according to the execution result (i.e., the output data set) of each task, so that each task workflow is closer to the current data set, so as to improve the accuracy and correct rate of the workflow. That is to say, when the fixed path workflow causes the execution result of a task to fail, the execution system still continues to execute the fixed path workflow, which consumes time for task execution and the task workflow cannot be adjusted according to the current data in real time. Therefore, unlike the fixed path workflow, the workflow generation device 100 and the execution method of the disclosure may provide task paths closer to the current data, and automatically end the workflow when the output data is the same as the target data. Meanwhile, different task paths may be provided in various scenarios with different feature data, which has higher inclusiveness and accuracy, and provides better task workflows and execution results for each enterprise and region.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A data-based workflow generation device, communicated with a data query system and a task query system, comprising:

a storage device; and a processor, coupled to the storage device, wherein the processor is configured to obtain a data set from the data query system, the data set comprises a current data set and a target data set;

wherein the processor is configured to take the data set as an input data set, and search a data map from the task query system according to the input data set to obtain a best task path, wherein the processor is configured to execute the best task path to obtain an output data set, wherein the processor is configured to take the output data set as the input data set, and repeatedly search the data map from the task query system according to the input data set, obtain the best task path and input the best task path to a server to execute the best task path through the server until the output data set is the same as the target data set, wherein the current data set comprises description data, state data, and feature data, wherein the processor is configured to determine a matching degree with a plurality of task paths in the data map based on the description data, the state data and the feature data of the data set, so as to select a task path with a highest matching degree from the plurality of task paths as the best task path, wherein the best task path is a task list formed by a plurality of data models, and each of the data models is formed of a corresponding input data set, a corresponding task, and a corresponding output data set, wherein the processor is configured to execute the best task path including the processor is configured to process the corresponding input data set having a data feature according to the corresponding task of a first data model in the task list, the processor is configured to output the corresponding output data set having another data feature, and the processor is configured to use the corresponding output data set as the input data set for a next data model after the first data model, until the corresponding tasks of the plurality of data models are processed, and the processor is configured to output the corresponding output data set that is the same as the target data set, wherein the data map comprises a plurality of task data and a directional parameter, and the directional parameter comprises node data and connection data, wherein the connection data is related to a connection relationship between the plurality of task data, and the node data is related to the description data, the state data, and data code.

2. The data-based workflow generation device according to claim 1, wherein the processor is configured to receive a request command, and the processor is configured to search the data query system according to the request command to obtain the data set.

3. The data-based workflow generation device according to claim 2, wherein the processor is configured to execute the best task path through a task workflow generation device.

4. The data-based workflow generation device according to claim 1, wherein the storage device stores the data set, task data, and the input data set.

5. The data-based workflow generation device according to claim 1, wherein the data map comprises a plurality of node data, wherein each of the node data in the plurality of node data corresponds to different description data and state data;

wherein adjacent node data comprises at least one connection data, wherein the connection data is related to feature data of a current data group.

6. The data-based workflow generation device according to claim 1, wherein the processor is configured to predetermine a plurality of reference description data and a plurality of reference state data, and predetermine a plurality of reference target data and creates a plurality of reference task data, wherein the processor is configured to create a plurality of reference task paths according to the plurality of reference description data, the plurality of reference state data, the plurality of reference target data, and a plurality of task data, wherein the processor is configured to select one of the plurality of reference task paths to generate the best task path, wherein the best task path comprises task data corresponding to the current data set.

7. The data-based workflow generation device according to claim 6, wherein the processor is configured to preemptively create the data map based on a relationship between the plurality of reference description data and the plurality of task data, and store the data map into the storage device.

8. A data-based workflow generation method, performed by a data-based workflow generation device comprising a processor and a storage device, comprising:

obtaining, by the processor, a data set from a data query system, the data set comprising a current data set and a target data set;

taking, by the processor, the data set as an input data set, and searching a data map from a task query system according to the input data set to obtain a best task path;

executing, by the processor, the best task path to obtain an output data set;

taking, by the processor, the output data set as the input data set, and repeatedly searching, by the processor, the data map from the task query system according to the input data set;

obtaining, by the processor, the best task path and inputting, by the processor, the best task path to a server; and executing, by the processor, the best task path through the server until the output data set is the same as the target data set, wherein the current data set comprises description data, state data, and feature data, wherein searching, by the processor, the data map according to the input data set to obtain the best task path comprises:

determining, by the processor, a matching degree with a plurality of task paths in the data map based on the description data, the state data and the feature data of the data set, so as to select a task path with a highest matching degree from the plurality of task paths as the best task path; and wherein the best task path is a task list formed by a plurality of data models, and each of the data models is formed of a corresponding input data set, a corresponding task, and a corresponding output data set, wherein the executing, by the processor, the best task path including processing, by the processor, the corresponding input data set having a data feature according to the corresponding task of a first data model in the task list, outputting, by the processor, the corresponding output data set having another data feature, and using, by the processor, the corresponding output data set as the input data set for a next data model after the first data model, until the corresponding tasks of the plurality of data models are processed, and outputting, by the processor, the corresponding output data set that is the same as the target data set, wherein the data map comprises a plurality of task data and a directional parameter, and the directional parameter comprises node data and connection data, wherein the connection data is related to a connection relationship between the plurality of task data, and the node data is related to the description data, the state data, and data code.

9. The data-based workflow generation method according to claim 8, wherein before receiving the data set, the method comprises:

receiving, by the processor, a request command; and searching, by the processor, the data query system according to the request command to obtain the data set.

10. The data-based workflow generation method according to claim 9, wherein executing, by the processor, the best task path through a task execution system.

11. The data-based workflow generation method according to claim 9, wherein searching, by the processor, the data map according to the input data set to obtain the best task path further comprises:

storing, by the processor, the data set, task data, and the input data set.

12. The data-based workflow generation method according to claim 8, wherein the data map comprises a plurality of node data, wherein each of the node data in the plurality of node data corresponds to different description data and state data;

wherein adjacent node data comprises at least one connection data, wherein the connection data is related to feature data of a current data group.

13. The data-based workflow generation method according to claim 9, further comprising:

predetermining, by the processor, a plurality of reference description data and a plurality of reference state data;

predetermining, by the processor, a plurality of reference target data and creates a plurality of reference task data;

creating, by the processor, a plurality of reference task paths according to the plurality of reference description data, the plurality of reference state data, the plurality of reference target data, and a plurality of task data, wherein searching, by the processor, the data map according to the input data set to obtain the best task path comprises:

selecting, by the processor, one of the plurality of reference task paths to generate the best task path;

wherein the best task path comprises task data corresponding to the current data set.

14. The data-based workflow generation method according to claim 13, wherein after creating the plurality of reference task paths, the method further comprises:

preemptively creating, by the processor, the data map based on a relationship between the plurality of reference description data and the plurality of task data; and storing, by the processor, the data map into a storage device.

* * * * *